United States Patent [19]
Dickens et al.

[11] Patent Number: 5,987,387
[45] Date of Patent: Nov. 16, 1999

[54] METHOD OF DIP MOVEOUT ANALYSIS ON A MASSIVELY PARALLEL COMPUTER

[75] Inventors: Thomas A. Dickens; William A. Schneider, Jr.; Dennis E. Willen, all of Houston, Tex.

[73] Assignee: Exxon Production Research Company, Houston, Tex.

[21] Appl. No.: 09/011,193

[22] PCT Filed: Oct. 2, 1996

[86] PCT No.: PCT/US96/15818

§ 371 Date: Jan. 29, 1998

§ 102(e) Date: Jan. 29, 1998

[87] PCT Pub. No.: WO97/13213

PCT Pub. Date: Apr. 10, 1997

[51] Int. Cl.[6] .................................................. G06F 19/00
[52] U.S. Cl. .................................................. 702/14
[58] Field of Search .................. 702/14, 16, 17, 702/18; 367/50, 71, 72, 73

[56] References Cited

U.S. PATENT DOCUMENTS

| | | | |
|---|---|---|---|
| 4,742,497 | 5/1988 | Beasley et al. | 367/52 |
| 4,878,204 | 10/1989 | Black et al. | 367/53 |
| 4,974,212 | 11/1990 | Sheiman | 367/21 |
| 5,198,979 | 3/1993 | Moorhead et al. | 364/421 |
| 5,285,422 | 2/1994 | Gonzalez et al. | 367/53 |
| 5,394,325 | 2/1995 | Schneider | 364/421 |

FOREIGN PATENT DOCUMENTS

WO 95/15506  6/1995  WIPO .

OTHER PUBLICATIONS

Artley, C., and Hale, D., "Dip–Moveout processing for dept variable velocity", Geophysics, vol 59, 610–622 (Apr. 1994).

Biondi, B, and Moorhead, W.D., "Data Parallel Algorithm for Kirchoff 3–D DMO", 62 SEG Extended Abstracts, 330–333 (1992).

Black, J.L., Schleicher, K.L. and Zhang, L., "True aamplitude imaging and dip moveout", Geophysics vol. 58, 47–66 (Jan. 1993).

Deregowski, S. M. and Rocca, F., "Geometrical Optics and Wave Theory of Constant Offset Sections in Layered Media", Geophysical Prospecting, vol. 29, 374–406 (1981).

Dietrich, M., Cohen, J. K.,, "Migration to ZeroOffset (DMO) for a Constant Vertical Velocity Gradient: An Analytical Formulation", Geophysical Prospecting vol 41, 621–643, (1993).

Gray, S. H., "Frequency–Selective Design of Kirchoff Migration Operator", Geophysical Prospecting vol. 40, 565–571 (1992).

Lu, L., Bell, L., and Lim, K., "Parallel Implementation of a 3–D DMO on shared memory systems", 64th SEG Extended Abstracts, 214–217 (1994).

Winbow, G. A. and Trantham, E. C., "Nonaliased Amplitude Preserving, AVO", 64th American International Meeting Society of Exploration Geophysicists, Expanded Abstrats, 719–721 (1994).

Primary Examiner—Donald E. McElheny, Jr.
Attorney, Agent, or Firm—S. P. Koch; F. E. Reid

[57] ABSTRACT

A method of processing seismic data on parallel processors, preferably on a massively parallel processor. The input ot the process is seismic data from one or more of a number of seismic lines. The end product of the invention is a DMO corrected, zero-offset seismic image of the subsurface. By repeating the method on different input offsets, the variation in reflection strength of a reflector as a function of the angle of incidence can be examined. The method includes a two stage parallelization. First, a parallelization over the incoming traces generates a suite of DMO-corrected partial images for each point on each incoming trace. Secondly, a parallelization over output locations accumulates and combines the partial images, and produces output traces.

10 Claims, 9 Drawing Sheets

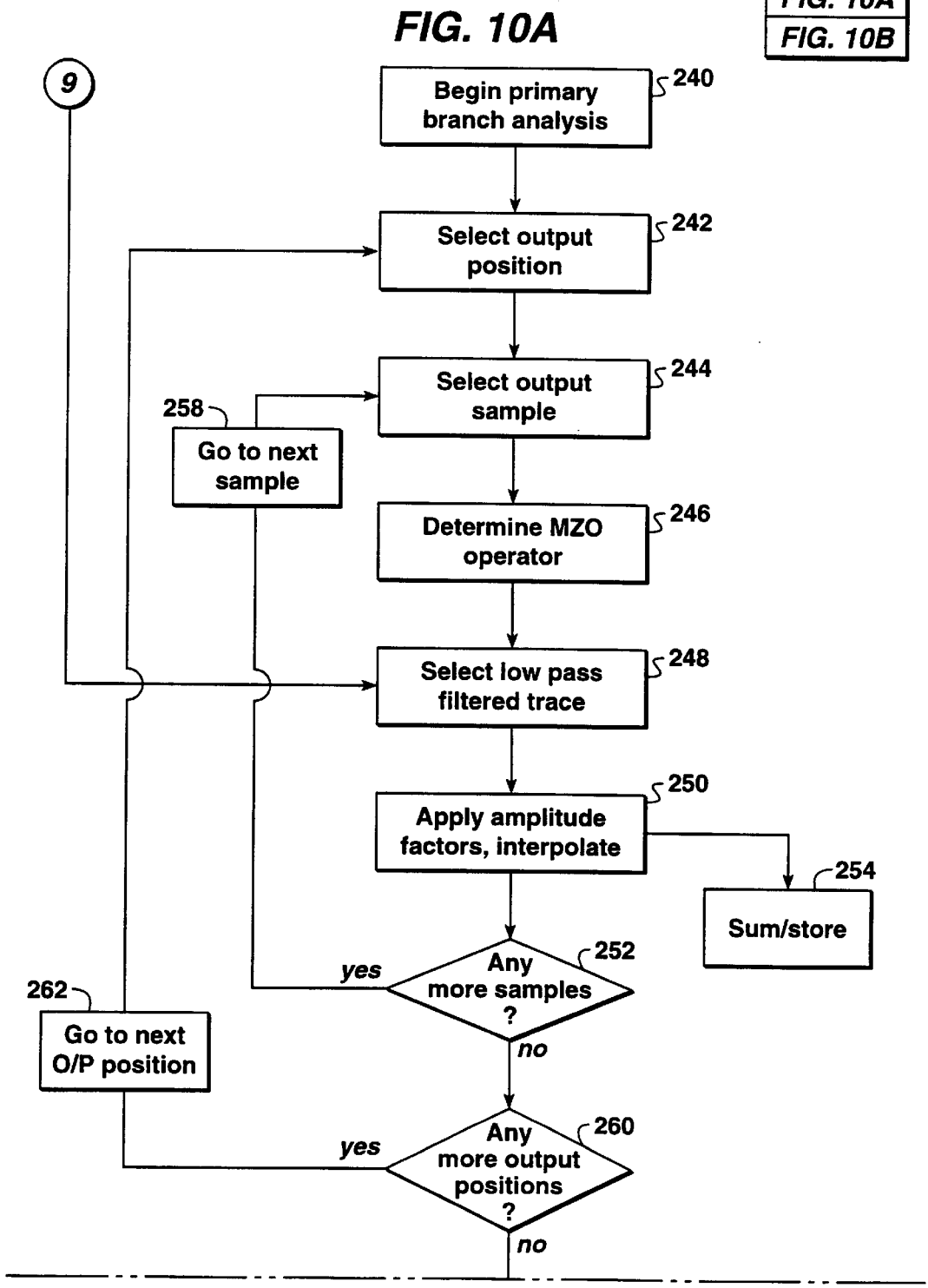

METHOD OF DIP MOVEOUT ANALYSIS ON A MASSIVELY PARALLEL COMPUTER

FIELD OF THE INVENTION

This invention relates to the field of geophysical prospecting. Specifically, the invention involves a method of processing seismic data using parallel processors to obtain a partially migrated image of prestack seismic data.

BACKGROUND OF THE INVENTION

The search for subsurface hydrocarbon deposits typically involves a sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy which vary as a function of time, receiver position, and source position and, most importantly, vary as a function of the physical properties of the structures from which the signals reflect. The data analyst uses these traces along with a geophysical model to develop an image of the subsurface geologic structures.

The analysis phase involves procedures that vary depending on the nature of the geological structure being investigated, and on the characteristics of the dataset itself. In general, however, the purpose of a typical seismic data processing effort is to produce an image of the geologic structure from the recorded data. That image is developed using theoretical and empirical models of the manner in which the signals are transmitted into the earth, attenuated by the subsurface strata, and reflected from the geologic structures. The quality of the final product of the data processing sequence is heavily dependent on the accuracy of these analysis procedures.

The final phase is the interpretation of the analytic results. Specifically, the interpreter's task is to assess the extent to which subsurface hydrocarbon deposits are present, thereby aiding such decisions as whether additional exploratory drilling is warranted or what an optimum hydrocarbon recovery scenario may be. In that assessment, the interpretation of the image involves a variety of different efforts. For example, the interpreter often studies the imaged results to obtain an understanding of the regional subsurface geology. This may involve marking main structural features, such as faults, synclines and anticlines. Thereafter, a preliminary contouring of horizons may be performed. A subsequent step of continuously tracking horizons across the various vertical sections, with correlations of the interpreted faults, may also occur. As is clearly understood in the art, the quality and accuracy of the results of the data analysis step of the seismic sequence have a significant impact on the accuracy and usefulness of the results of this interpretation phase.

In principle, the seismic image can be developed using a three-dimensional geophysical model of seismic wave propagation, thereby facilitating accurate depth and azimuthal scaling of all reflections in the data. Accurately specified reflections greatly simplify data interpretation, since the interpretational focus can be on the nature of the geologic structure involved and not on the accuracy of the image. Unfortunately, three dimensional geophysical models frequently require intolerably long computation times, and seismic analysts are forced to simplify the data processing effort as much as possible to reduce the burdens of both analysis time and cost.

In addition to the 3-D computation challenge, the analyst faces a processing volume challenge. For example, a typical data acquisition exercise may involve hundreds to hundreds of thousands of source locations, with each source location having hundreds of receiver locations. Because each source-receiver pair may make a valuable contribution to the desired output image, the data handling load (i.e., the input/output data transfer demand) can be a burden in itself, independent of the computation burden.

FIG. 1 depicts a perspective view of a region 20 of the earth for which a geophysical image is desired. On the surface 18 of the earth are shown a number of shot lines 2 along which the seismic data are acquired. As shown in FIG. 1A, shot lines 2 consist of a sequence of positions at which a seismic source 3 is placed and from which seismic signals 5 are transmitted into the earth. Receivers 4 placed along each line receive the signals from each source position after reflection from various subsurface reflectors 6.

A first method of managing the seismic data burdens discussed above involves careful definition of the region over which the data are acquired. Specifically, use of any available preliminary geologic and geophysical information may facilitate the minimization of the surface area over which seismic data may need to be acquired. Such a minimization will directly reduce the amount of data that is ultimately acquired. Furthermore, similarly careful planning of the spacing between shot lines will optimize the analysis effort by reducing data volume. Finally, optimization of the number of sources and receivers that are used, and of the spacing between adjacent source and receiver positions, will also benefit the data analyst.

None of these efforts can be accomplished without a penalty. For example, relatively wide spacing between shot lines, or between sources and receivers, reduce the resolution of the computed seismic image, thus making interpretation more difficult. In addition, complex geologic features may not be resolvable without relatively close spacing. And finally, certain data acquisition exercises, such as in relatively unexplored areas, do not allow optimization of the surface area over which data is to be acquired. As a result, the data handling burden cannot be entirely eliminated through data acquisition planning.

The recent availability of massively parallel processors offers a significant opportunity to seismic data analysts. Massively parallel processors (MPPs) have multiple central processing units (CPUs) which can perform simultaneous computations. By efficient use of these CPUs, the weeks or months previously required for complex analyses can be reduced to a few days, or perhaps a few hours. However, this significant advantage can only be realized if efficient computational algorithms are encoded in the MPP software. Thus, the opportunity MPPs offer seismic data analysts also creates a challenge for the development of suitable computational algorithms that take advantage of the multiple CPUs.

This challenge can be easily discussed by considering the manner in which computational algorithms have most commonly been written for existing seismic analysis routines. Until recently, computers relied on a mode of operation referred to as sequential computing. Sequential computing involves use of analytic routines that perform only a single procedure, or perhaps focus on a single subset of the data or image, at any given time. This is a direct result of a computer having only one CPU. For that reason, the only optimization procedures that can be employed on single CPU computers are those which increase the efficiency of the processing as to the procedure or subset. Because all calculations must ultimately be performed by that single CPU, however, the options for obtaining high performance are innately limited.

On the other hand, the multiple CPU capability of MPPs offers an obvious simultaneous computation advantage. This advantage is that the total time required to solve a computational problem can be reduced by subdividing the work to be done among the various CPUs, provided that the subdivision allows each CPU to perform useful work while the other CPUs are also performing work. Unfortunately, the disadvantage of multiple CPU hardware is that the sequential processing methods that have long been used in software development must be replaced by more appropriate parallelized computing methods. Simply stated, MPPs require that processing methods be developed which make efficient use of the multiple CPU hardware. Ideally, these methods should organize the distribution of work relatively evenly among the processors, and ensure that all processors are performing necessary computations all of the time, rather than awaiting intermediate results from other processors.

The challenge of defining parallelized processing methods, and of optimizing those parallelized methods once defined, is particularly acute in the seismic data processing arena. Seismic data consists generally of a large number of individual traces, each recorded somewhat independently of the other traces. Logically enough, sequential computing methods that require the analytic focus to be placed on a single calculation at a time adapt well to analysis of these independent traces. This is true even though computational bottlenecks may exist. For example, portions of the analytic sequence may require relatively more computation time than other portions, must be completed before other calculations may proceed, or may rely on similar input data as other traces, for example traveltimes. Since no simultaneous computations occur in sequential processing, none of these bottlenecks lead to a reduction in computational efficiency with a single CPU, except as to the total processing time that is required. Except as to that total time requirement, the existence of such computational bottlenecks does not otherwise pose problems for the analyst. To take full advantage of MPP computing capabilities, however, where the goal is to perform simultaneous processing in all CPUs, methods for optimizing the seismic analysis phase by eliminating such bottlenecks must be developed.

This advantage of an MPP becomes clear by considering the limitation which calculation time places on image region size in single CPU computers. Increasing the size of the image, e.g., by expanding the size of cube 20 in FIG. 1, or increasing the amount of data to be processed, e.g., by adding additional sources 3 and receivers 4 to shotlines 2, increase the total computation. That direct impact on calculation time places a heavy burden on seismic analysts to optimize image size, especially since even small image regions may require weeks of computation time on even the highest speed sequential processing computers. In contrast, efficient processing on MPPS, which may have as many as or more than 256 individual CPUs, should only involve minimally lengthened computation times, since each CPU would assume just a fraction, for example 1/256, of the additional work required by the larger region. This potential for scalability of the image region and the work load required in image generation is a principal benefit of MPPs, a benefit that can only be realized if parallelized seismic processing methods allowing such workload scalability are developed.

Basic considerations for determining efficient parallelized seismic processing methods become evident by reconsidering the above review of the seismic analysis process. As noted, the purpose of seismic analysis is to analyze measured seismic data using geophysical models to develop images of the subsurface. Therefore, each of three principal processing components—data, model, and image—may be considered to be a candidate for distributing computational work among the various processors in an MPP. One option for distributing work among the processors would be to assign different groups of the input seismic trace data to different processors. For example, traces may be grouped by source locations, with different processors being assigned different groups. Similarly, the output image could be subdivided and assigned to different processors. Finally, it may also be possible to subdivide the geophysical model used to generate the output image into groupings that can be assigned to the various processors. (That model is generally considered to be embodied in the arithmetic operations required by the mathematical model that is the subject of the processing effort. For example, in seismic analysis the mathematical model is often based on the wave equation). For example, the data may be transformed into the frequency domain, with individual frequencies assigned to individual processors. It may also be possible to develop combinations of these approaches. For example, groups of processors may be assigned collective responsibility for specific frequencies in the model and all depths in the image, while having individual responsibility for specific horizontal locations in the image. The challenge to the seismic data analyst is to determine methods of subdividing the seismic data, model, and image into components that can be assigned to individual processors in the MPP, thus allowing calculations to be performed in each processor independently of other processors. This subdivision of seismic data analysis into individual components is commonly referred to as seismic decomposition.

In a Single Instruction, Multiple Data stream (SIMD) MPP, the processing elements typically perform the same operation on multiple data streams. An example is the CM2, a product of the Thinking Machines Corporation. These kinds of machines typically lack shared memory, i.e., each processor has its own separate memory unit and the information in the memory cannot be directly accessed by other processors. The individual processors typically have limited computing capability and memory. Because of the large number of processing elements and a lack of shared memory, data transfer between the processing elements is a major bottleneck in efficient utilization of the capability of the machines. Even with sophisticated interconnection techniques, such as in a hypercube arrangement, transfer of data between processors is a major factor in the running time of programs.

Other computers have much more powerful elements in arrays of tens or hundreds. The T3D, a product of Cray Research Corporation, is an example of this kind of machine. Besides having individual processing elements that are much more powerful than those in the CM2, the T3D has fewer of the elements and a physically distributed, logically shared memory. This Multiple Instruction Multiple Data stream (MIMD) machine has different elements performing different operations on different parts of the data at the same time. The reduced number of processing elements means that data does not have to be transferred to as many elements as in a SIMD machine. Because of the increased sophistication and cost of the individual elements and because of their fewer numbers, efficient utilization requires that the load on the processing elements be balanced. An additional factor is that each processing element must accommodate a larger subset of the overall data volume; computations that involve sorting of the data could become more complicated.

As would be familiar to those knowledgeable in the art, prestack migration processes are computationally very demanding. As an alternative to prestack migration, a prestack partial migration could be done followed by a poststack time or depth migration. In many cases, this leads to a significant reduction in computation time without a serious loss in accuracy. One common method of prestack partial migration is the dip moveout (DMO) process. The process of DMO correction is discussed at length in Deregowski, S. M. and Rocca, F., "Geometrical Optics and Wave Theory of Constant Offset Sections in Layered Media", 29 *Geoph. Prosp.* 374 (1981). The DMO operator can be visualized as the result of two steps. The first step is to find the isochron for a given source and receiver position. The term isochron means the set of points such that the traveltime from the source to each of the points and back to the receiver is equal to the observed travel time. Those knowledgeable in the art would recognize that, for a constant velocity medium, the isochron is an ellipsoid with foci at the shot and the receiver. The normal to any point on this ellipsoid defines both a position on the surface of the earth and a zero-offset travel time corresponding to the ray defined by the normal. The DMO operation consists of moving data from an original observation point to a set of such possible surface positions and determining the corresponding zero-offset travel times. For a constant velocity medium, the surface positions fall along the major axis of the traveltime ellipsoid. The Kirchhoff DMO procedure consists of 1) for each input trace the generation of a set of replacement traces at a number of output surface positions followed by 2) the summation, at each output location, of the replacement traces from each input location, resulting in 3) a partially migrated image.

Deregowski and Rocca showed that a velocity independent DMO operator for a common offset section can be expressed as:

$$t_0 = t_n \sqrt{1 - \frac{x^2}{h^2}}, \quad (1)$$

where $t_0$ is zero-offset time, $t_n$ is the normal moveout (NMO) corrected time, h is half the source-receiver offset and x is the migration distance from the midpoint, i.e., the distance between the midpoint of the source-receiver pair and the position of the equivalent zero-offset replacement trace. Zero-offset time is time measured along the replacement trace. The NMO corrected time is obtained by the usual NMO procedure using the root mean square (rms) velocity.

As is known to those familiar with the art, conventional stacking of common midpoint (CDP) gathers that uses a dip corrected rms velocity is unable to deal with reflectors of different dips. The zero offset section obtained by DMO, on the other hand, correctly represents reflections from different dips. Equation 1 defines a 2-D DMO operator that moves energy into a vertical plane through the source and receiver and produces an image that can be processed by post-stack, zero-offset migration methods at a significant saving in computation time.

When the medium does not have constant velocity, the DMO operator is more complicated. A partial solution for the problem of a medium with constant vertical velocity gradient is given in Artley, C., and Hale, D., "Dip-Moveout Processing for Depth Variable Velocity", 59 *Geophysics* 610 (April 1994). However, Artley and Hale considered only the inline component of the DMO operator. In fact, for the case of a medium with a vertical velocity gradient, the DMO operator, which is generally referred to as the Migration to Zero Offset (MZO) operator, is no longer limited to a vertical plane passing through the shot and receiver positions. A detailed analysis of the problem of MZO for a constant velocity gradient is given by Dietrich, M., and s Cohen, J. K., "Migration to Zero Offset (DMO) for a Constant Vertical Velocity Gradient: An Analytical Formulation", 41 *Geophysical Prospecting* 621, (1993). The isochron in this case is a quartic polynomial in x, y and z, and the migration to zero offset (MZO) operator is multi-valued. One branch of the operator is a saddle-shaped operator related to smaller dips and approximately corresponds to the conventional DMO operator for the case of no velocity gradient. The second branch of the operator is produced from larger dips or overturned reflectors. Both of these branches of the DMO operator have crossline components. Dietrich and Cohen's work has several limitations. First, their operator is based on ray-theoretical considerations. As a result, where the two branches of the operator come together there is an abrupt termination, with rather strong amplitude, of the primary branch of the operator. In addition, even away from the cusp termination, the amplitudes given by Dietrich and Cohen are inconsistent with the amplitudes given by prior art references relating to the problem of amplitudes for the DMO operator.

U.S. Pat. No. 5,285,422 issued to Gonzalez et. al. teaches a method for performing a 3-D DMO in the presence of a vertical velocity variation in the subsurface. In this method, the DMO operator for constant velocity is applied, and followed by the application of a residual operator that has the effect of squeezing the ellipsoid from the first step. However, the method only addresses the primary branch of the multivalued operator. In U.S. Pat. No. 4,974,212, Scheiman deals with the problem of smearing caused by the operation of forcing the output location into a discrete set of bins on an areal grid. However, that method does not address the problem of vertical inhomogeneities. In addition to these limitations both Gonzalez et. al. and Sheiman both are single CPU-oriented methods and cannot be efficiently implemented on an MPP.

The implementation of a 3-D DMO process on a shared memory parallel computer is discussed by Lu, L., Bell, L., and Lim, K., "Parallel Implementation of 3-D DMO on Shared Memory Systems", 64 *SEG Extended Abstracts* 214, (1994). Lu et. Al. implement a parallelization of tasks over input shot gathers only, but not in the output phase of the DMO calculations. However, the disclosure is limited to DMO of single offset data, and in addition has several limitations that reduce the efficiency of the overall process. Specifically, because multiple processors may be attempting to write (or add) their output to the same memory location of the MPP, a "memory locking" procedure is incorporated in the process. This memory locking procedure results in a slowdown of the process, since processors will often be delayed in accessing the desired memory locations. In addition, after processing of each group of shots is completed, the disk file is updated using an analogous "file locking". This too is a bottleneck in the efficiency of the method.

An MPP implementation for a 3-D DMO process on a CM2 (or on the Thinking Machine CM5 computer) is discussed by Biondi, B. and Moorhead, W. D., "Data Parallel Algorithm for Kirchhoff 3-D DMO", 62 *SEG Extended Abstracts* 330, (1992). The implementation has parallelism over input shot gathers and also over output swaths. Successive shot gathers are loaded onto consecutive processors until all the processors are full, each processor having one or more gathers as part of its input. Each processor is also responsible for a number of output locations. During the computation phase, each processor first computes the DMO replacement traces for its input traces and only for the locations for which it also has the output task. Once all the processors have completed calculations for the initial input traces, each processor sends its input traces to the next processor and the DMO operations are repeated. This "pipelining" is repeated, as many times as necessary, until output traces have been computed for all output locations. The pipelining is necessary because of the limited memory available on the individual processors of a CM-2 or CM-5. The processors also drop input traces incrementally, beginning with the nearest offset, to reduce the data transfer. This method requires that the shot gathers be contiguous and in physical order, or the load balancing between the processors will be poor. In addition, since each processor is responsible for contiguous portions of the output, bottlenecks may occur in certain portions of the model where, because of complicated velocity models, more computations are needed. Finally, the load balancing in such a scheme will deteriorate when, as is commonly the case, certain traces are missing from the input data set.

Gonzalez et. Al., Lu et. al. and Biondi and Moorhead deal only with the kinematics of the DMO operation, i.e., the DMO calculation involves a straightforward summation of the generated replacement traces. They do not properly handle the amplitude and phase information in the seismic reflections. The problem of preserving amplitudes and phase information as part of the DMO process is discussed by Black, J. L., Schleicher, K. L. and Zhang, L., "True-Amplitude Imaging and Dip Moveout", 58 *Geophysics* 47 (January 1993). Black et. al. point out that merely summing the contributions, at the appropriate times, from various input traces can give a misleading image of the subsurface. In particular, the amplitudes of steeply dipping reflectors would be attenuated with respect to horizontal reflectors. Those knowledgeable in the art would recognize that amplitude and phase information play an important role in interpretation of subsurface lithology and fluid content and would hence recognize the desirability of preserving amplitude and phase information. Black et. al. also discuss the problem of aliasing wherein, due to too large a distance between input trace positions, steep dips are improperly imaged. Black et. al. do not, however, suggest a solution to that problem.

Thus, there is a need for an invention that implements an MZO process on an MPP which efficiently load balances the DMO calculations, parallelizes on input and output, is able to handle multiple offsets, is able to handle vertical velocity variations, produces accurate images using both branches of the MZO operator, and does not require the data to be contiguous. In addition, the invention should more accurately preserve amplitude and phase information in the seismic data than does the prior art, and should also avoid aliasing errors. The present invention satisfies this need.

SUMMARY OF THE INVENTION

The present invention is a method of processing seismic data on parallel processors, preferably on a massively parallel processor (MPP). The input to the process is seismic data from one or more of a number of seismic lines. The end product of the invention is a DMO corrected, zero-offset seismic image of the subsurface. By repeating the method on different input offsets, the variation in reflection strength of a reflector as a function of the angle of incidence can be examined. The advantage of amplitude versus offset analysis of seismic data will be understood by those familiar with the art.

The method includes a two stage parallelization. First, a parallelization over the incoming traces generates a suite of DMO-corrected partial images for each point on each incoming trace. Secondly, a parallelization over output locations accumulates and combines the partial images, and produces output traces.

In some embodiments, it is a feature of this invention that the data input to the computer may be sorted in any order, though the order is preferably a common offset sort in sequence.

In some embodiments, it is a feature of the invention that if the memory allocation on the processors performing analysis becomes full, there are other processors that write data on disk, freeing up memory locations on the "analysis" processors In some embodiments, it is a feature of the invention that memory usage and interprocessor communication are balanced by ensuring that all of the analysis processors are responsible for output locations interleaved throughout the model. This interleaving balances the memory requirements of the individual analysis PEs so that there is less idle time when data are being written out to disk due to a particular PE reaching the limits of its memory.

In some embodiments, it is a feature of the invention that all the processing for any given input trace is performed by a single processor. This eliminates the need to pass the input traces from one processor to another, another communication burden.

In some embodiments, it is a feature of this invention that amplitude and phase information are preserved in the imaging process more accurately than in previous methods. The imaging process can be used in the presence of vertical velocity gradients in the subsurface, and has an anti-aliasing feature such that the maximum possible frequency in the data is used without losing the ability to recognize steep dips.

The invention is an improvement over prior art in that the discontinuities in the output image due to the presence of a cusp in the MZO are eliminated. It is also a feature of the invention that, where vertical velocity gradients are present, both branches of the MZO operator are used in the imaging process. This makes the invention useful in imaging the steeply dipping and overturned reflectors that give rise to the secondary branch of the MZO operator.

BRIEF DESCRIPTION OF THE DRAWINGS

The present invention and its advantages will be more easily understood by reference to the following detailed description and the attached drawings in which:

FIGS. 10A and 10B shows the steps performed by each processor in producing a preliminary set of MZO corrected traces for the imaging in the second embodiment.

DETAILED DESCRIPTION OF THE INVENTION

The present invention is a method of processing seismic data on a parallel processor. The method may be employed on any type of parallel processing computer that has more than one processor available to perform analysis and/or input/output tasks. For example, a Cray Y-MP, which has up to eight processors, may be employed. Networked personal computers or workstations may also be employed. In a preferred embodiment, the method will be employed on a massively parallel processor (MPP) having 16 or more processing elements. One example of such an MPP is the T3D made by the Cray Research Corporation. For convenience, and not to be construed as limiting, the abbreviation MPP will be used herein to refer to any parallel processing computer suitable for the present method. However, use of MPP in that manner is in no way to be construed as limiting application of the present method to solely those computers deemed by the commercial marketplace to be massively parallel.

Figure 1:
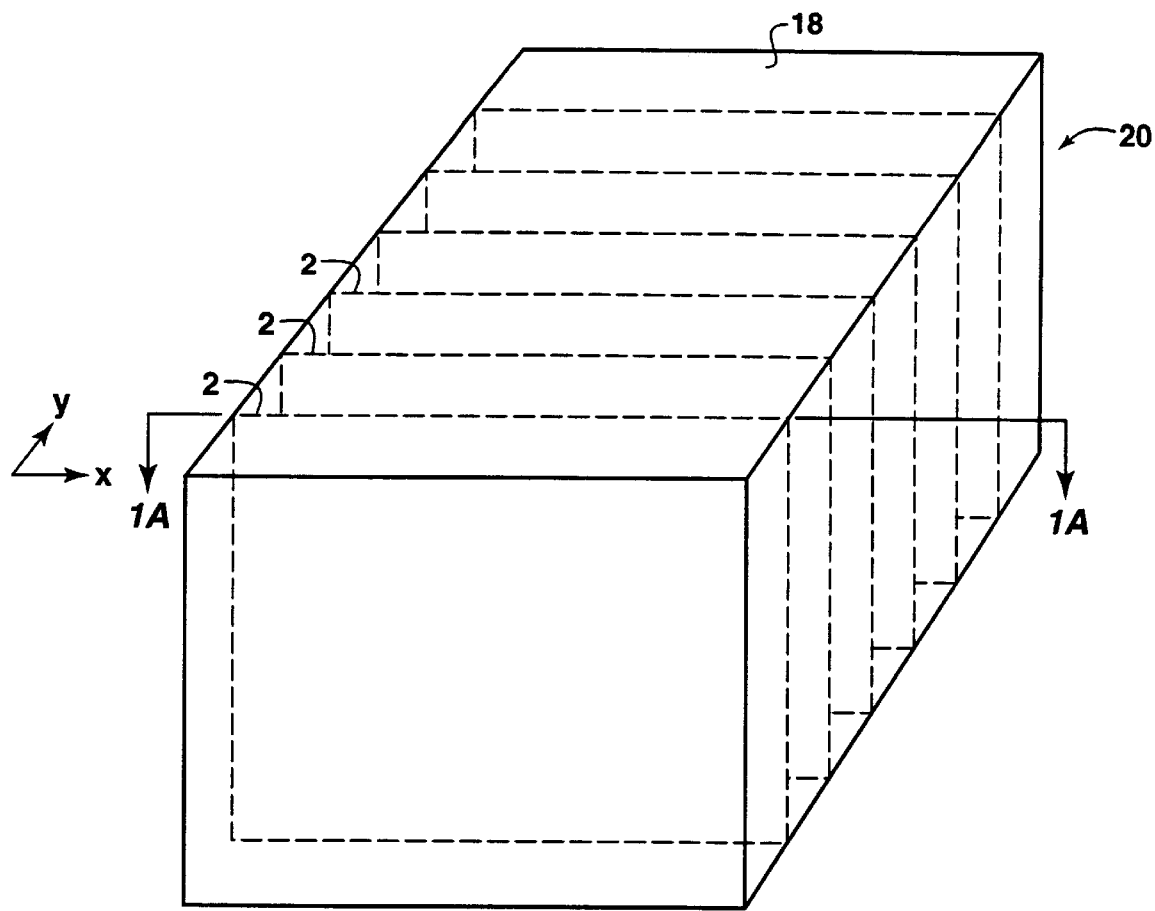
FIGS. 1 and 1A schematically illustrate the data acquisition configuration typically used in 3-D seismic exploration.
Figure 1A:
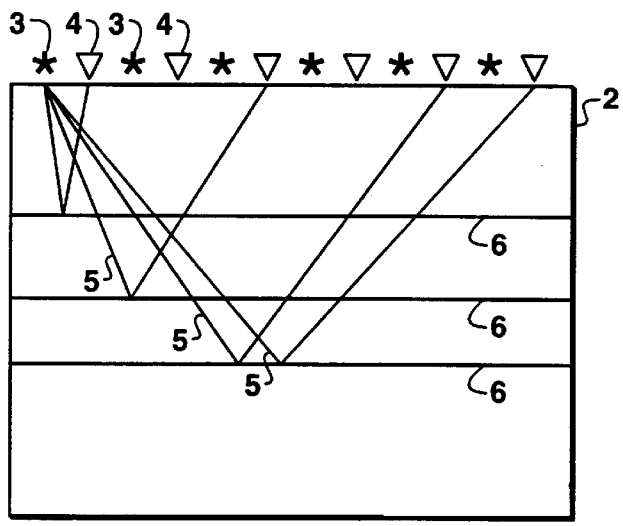

As is well known, seismic data processing methods generally start with data from a portion of the earth's surface. FIG. 1 depicts a perspective view of a region 20 of the earth for which a geophysical image is desired. On surface 18 of the earth are shown a number of shot lines 2 along which the seismic data are acquired. As shown in FIG. 1A, shot lines 2 consist of a sequence of positions at which a seismic source 3 is placed and from which seismic signals 5 are transmitted into the earth. Receivers 4 placed along each line receive the signals from each source position after reflection from various subsurface reflectors 6.

The input to the process is seismic data from a series of seismic lines 2 acquired to obtain an image of a 3-D data volume of the subsurface, 20. The end product of the invention is a DMO corrected, zero-offset seismic image.

Figure 2:
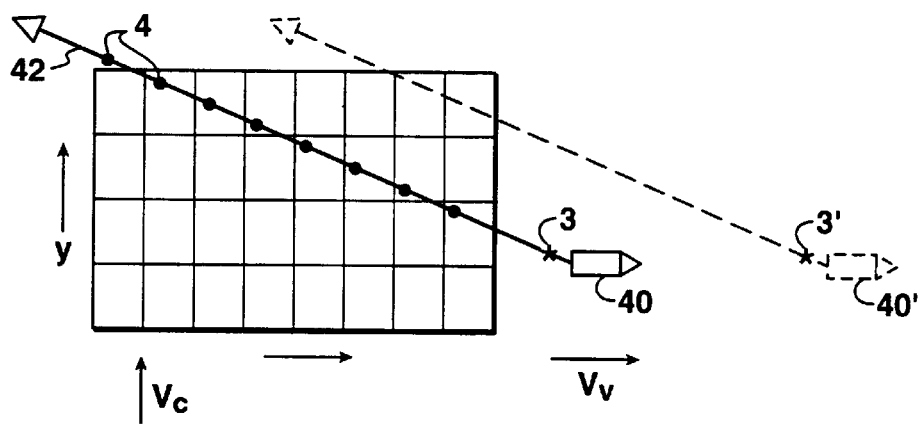
FIG. 2 illustrates the phenomenon of feathering and the introduction of crossline component to the data.

In addition, seismic data for a portion of a 3-D volume may, as a result of the phenomenon of "cable feathering", result from marine data acquisition for a single line. This is illustrated in FIG. 2, which shows a plan view of a seismic acquisition vessel, 40, with a cable, 42, behind it. The figure shows the receivers, 4, in the cable, as well as the source, 3, immediately behind vessel, 40. In the presence of a cross-currents, $V_c$ it is clear that the cable orientation will not be directly in line with the direction of motion of the vessel, $V_v$. The DMO operation will then take data from the source and every receiver, 4, on the cable and perform the DMO operation of generating replacement traces. Also shown in FIG. 2 is a rectangular grid of (x, y) bins that identify the positions to which the traces will be allocated after DMO. The bins are evenly spaced along the nominal direction of seismic data acquisition (i.e. along the x-axis. It can be seen that the DMO operation will produce, from a single source position, data at different crossline y-positions for each nominal inline x-position of the source, provided that $V_c$ is nonzero. Repetition of this for other source positions, 3', gives, at each x- position, data for many different y- positions. Provided that the orientation of cable is measured during data acquisition, the present method may obtain a 3D—image of such cable—feathered data.

The numbering of the bins, not shown in FIG. 2, starts at the bottom left hand corner of the grid and increases first in the x direction, and then proceeds to the next value of y with increasing values of x and so on. This is a matter of convenience to facilitate the intermediate I/O procedures discussed below with reference to FIG. 4.

Figure 3:
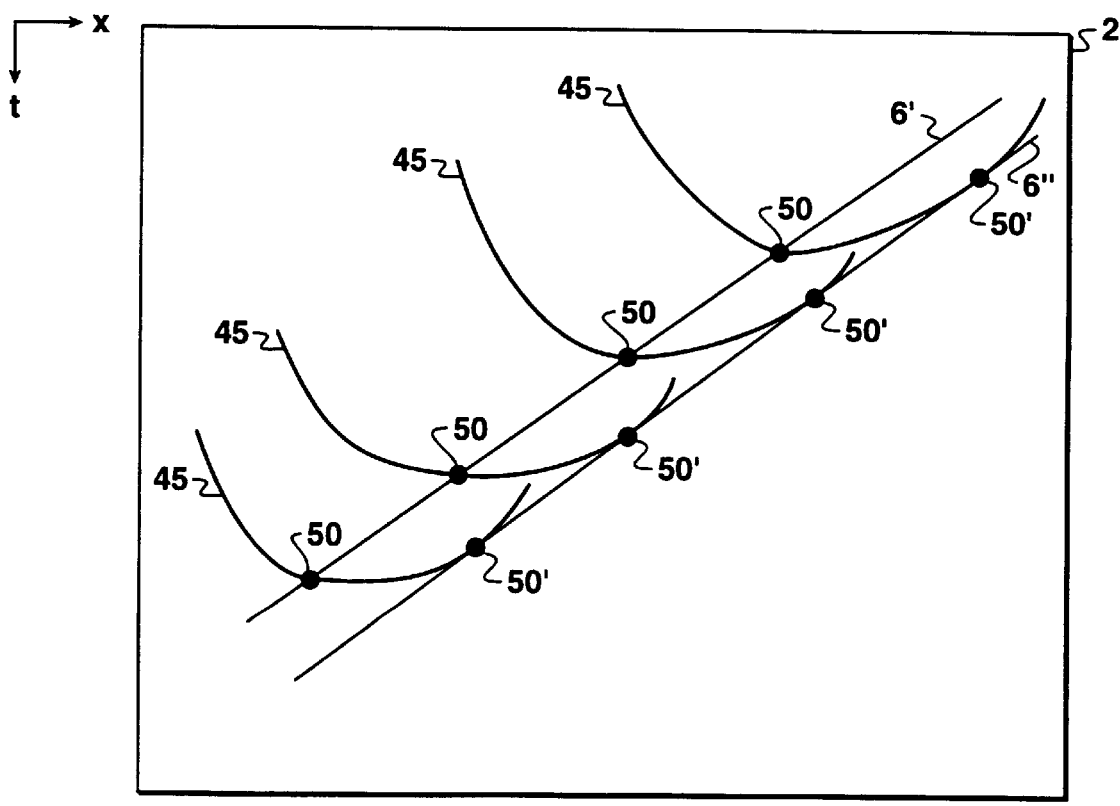
FIG. 3 illustrates the partial migration principle performed by DMO.

The principle of DMO is illustrated in FIG. 3, which depicts a single dipping reflection event, 6', on a constant offset seismic section. Also depicted are reflection points 50 on reflector 6' and DMO operator, 45, through each of the reflection points. The DMO image, 6" of the reflector 6' is obtained as the line of tangency to the DMO operators 45, i.e., through the points 50' which represent the equivalent zero offset images of reflector points 50. Kirchhoff DMO deals with the common geophysical dataset in which, instead of isolated points 50 on individual reflectors 6', the seismic section has data at many spatial and temporal points (x, t). In such situations, the image is obtained by "drawing" DMO operators through every input point. As will be understood to those skilled in the art, the operators will add constructively along a certain dip of each reflector for the region where the operator is less than a Fresnel zone away from the point of tangency to the dip. Summation of the resultant contributions at every output location thus gives the DMO image.

One of the features of the present invention is that the parallelization of DMO tasks differs for the input, i.e. analysis, stage as compared to the output stage. The MPP parallelization system to be employed in the input stage in a preferred embodiment of the present method, is best understood with reference to FIG. 4. The prestack data to which the DMO corrections are to be applied may be on tapes, 102, or disk or other input data storage device, 104. The data need not be in any particular order, although the performance is improved if the data are sorted into common-offset panels and are in shot order within the panels. The analyst will have specified the range of source-receiver midpoint positions and source-receiver offsets for which the DMO is to be performed. Preferably, the data set would have been preprocessed so that these would be the only data traces on the tape, 102, or device, 104. This sorting preference will be understood by those skilled in the art. The MPP, 100, consists of a number of processing elements (PEs), one of which, 106, is designated the control PE.

In a preferred embodiment, the control PE initially performs the task of reading seismic traces from input data storage device and transmitting those traces to a PE within a group of PEs, 108. It is one task of the control PE to transmit data to the next PE in the group, 108, that is available to analyze data. For convenience, the PEs in group 108 will be referred to as analysis PEs, though the role of these PEs changes at a later stage of the invention. The control PE sends the traces out asynchronously, reading ahead from the input device by as many traces as its memory will allow. Initially, of course, all of the PEs in the group, 108, are free and the control PE sends data traces to them in sequence.

One of the tasks of every PE in the group 108 is to perform the DMO operation. The effect of this operation is that every input trace creates a replacement trace at a multitude of output locations. Each replacement trace is transmitted to the PE that is responsible for creating an output image at each of the output positions. The allocation of the processors for the output locations is discussed below in reference to FIGS. 7 and 8. Processor group 110 performs input/output (I/O) functions during the input stage, as is discussed further below.

As an input, the analyst will specify, the output (x, y) bin locations for the 3-D volume of data, where x is the inline position, and y is the crossline position, as discussed above in reference to FIG. 2. This specification is required whether the data results from "cable-feathered" marine survey or from a standard grid of data. On the basis of this specification, each PE in group 108 is responsible for a number of x-slices in (x, y, t) space, where t is the time for which the PE is to produce an output image. It should be noted that the invention will generally process a single line of seismic data at a time and therefore the (x, y) bins will usually be in a swath centered on a line, 2, in FIG. 1. However, the present invention is not limited solely to single line data processing, as will be understood to those skilled in the art.

Figure 4:
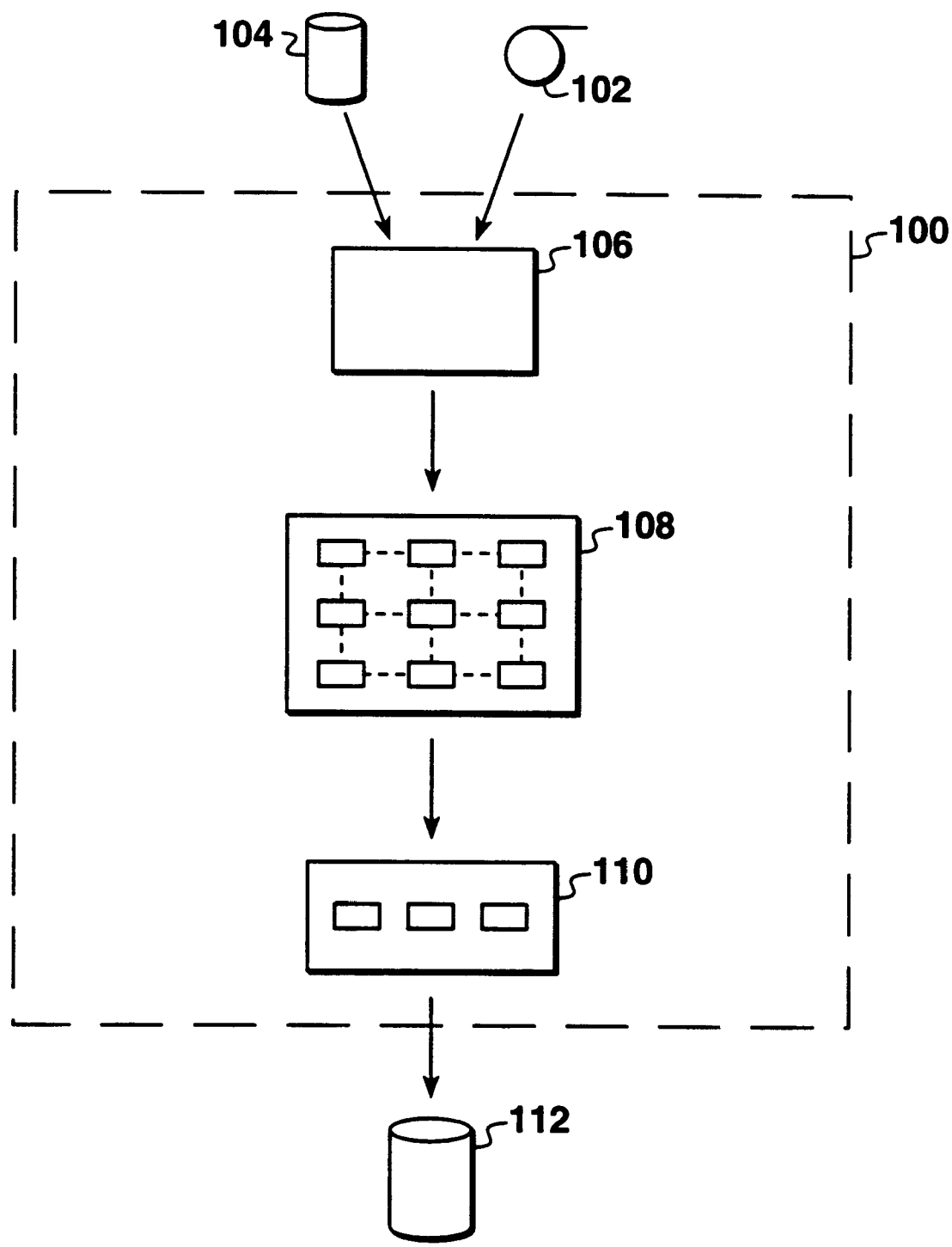
FIG. 4 depicts a simplified functional block diagram for the analysis phase of a parallel processing system on which seismic data processing using the present method may be performed.

The transmission of the replacement traces is a reciprocal operation, so that every PE in group 108 transmits data to every other PE in group 108 that is responsible for some output location associated with the newly created replacement traces. There will also be cases in which a PE creates a replacement trace for an output position that is its own responsibility. Schematically, this interprocessor communication is depicted in FIG. 4 by the hyphenated interconnection between the individual processing elements in the group of PEs, 108.

Figure 5:
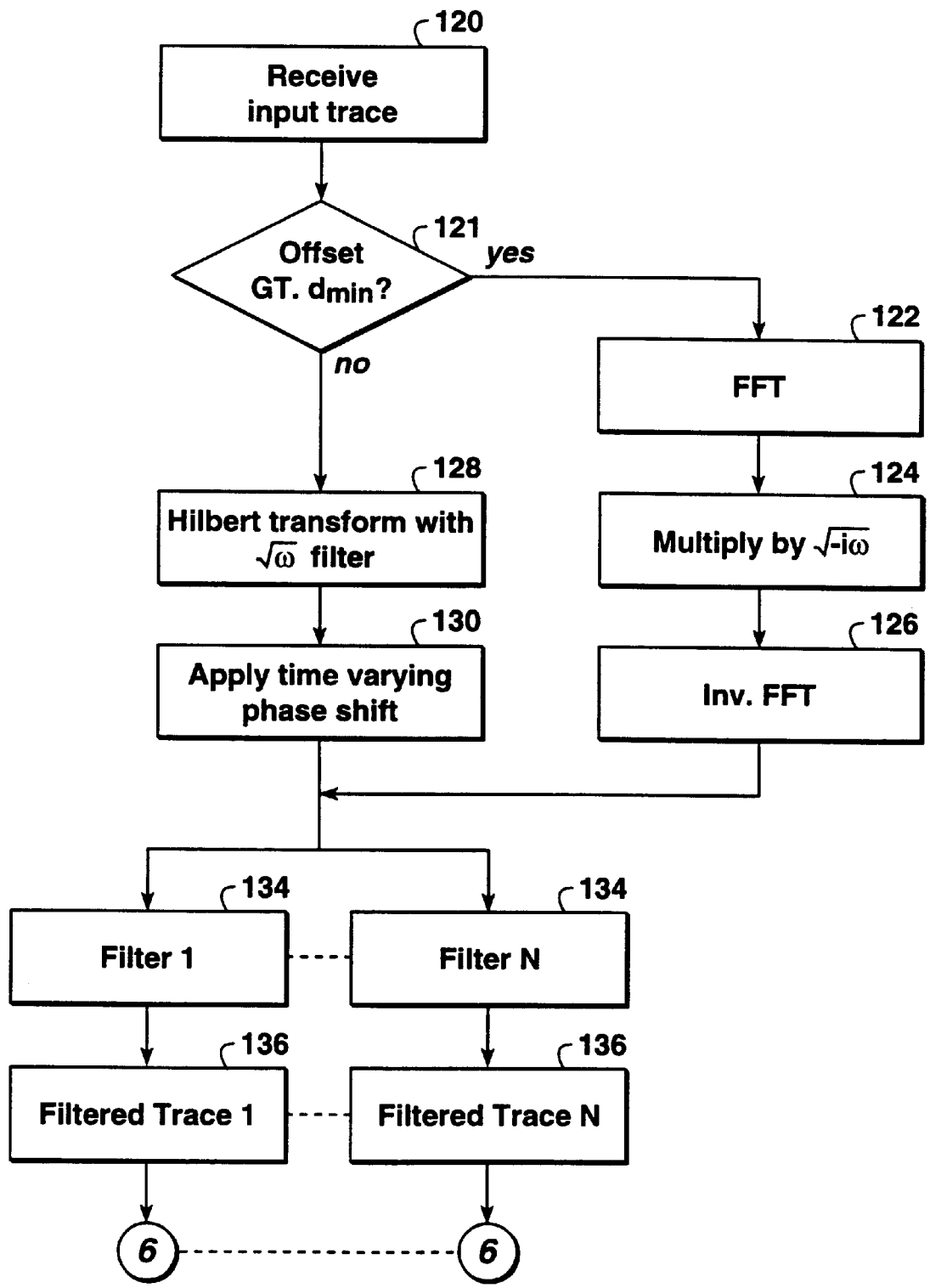
FIG. 5 shows a block diagram of the preliminary phase shifting and bandpass filtering performed on each trace prior to DMO correction in a first embodiment of the present invention.
Figure 6:
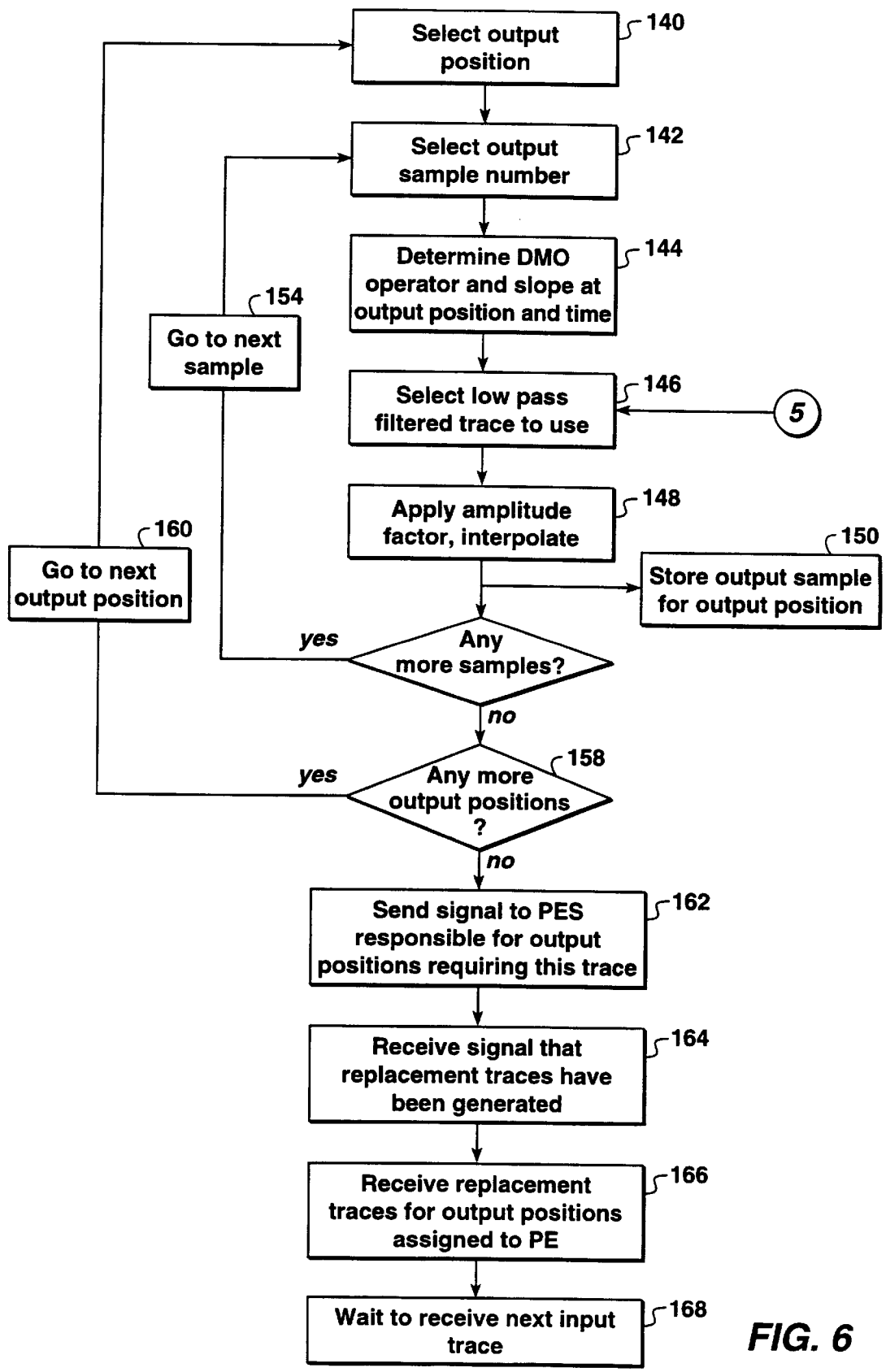
FIG. 6 shows the steps performed by each processor in producing a set of DMO corrected replacement traces for the imaging in a first embodiment of the present invention.

The process of DMO correction and creation of replacement traces is discussed in reference to FIGS. 5 and 6. This procedure relates to a constant velocity DMO analysis, and, in addition to an approximate solution for a layered earth model. Every PE in the group of PEs, 108, performs these tasks in parallel for the input traces that are sent by the control PE, 106, to the group. However, an improvement of the present invention over the prior art is that, once an input trace has been read into the memory of a PE in group 108, all processing of that particular input trace is done by that PE. As will be understood to those skilled in the art, the input traces at step 120 of FIG. 5 would preferably have been preprocessed to apply such routine steps as deconvolution, spreading compensation and NMO. The NMO correction should have been performed with the rms velocity function at the midpoint (x,y) location. The spreading correction should be applied to take advantage of the ability of the present invention to produce DMO corrected traces in true amplitude. If the traces have not been preprocessed, this is done by the PEs, using methods known to those familiar with the art.

At step 121, each PE checks to see if the source-receiver offset for the trace (typically defined by at the algebraic expression 2h where h is the midpoint offset of the source or receiver) is greater than a minimum value $d_{min}$. If it is, a Fourier transformation is applied at step 122, followed by a multiplication by $\sqrt{-i\omega}$, at step 124, where $\omega$ is the temporal frequency. This multiplication is the equivalent, in the time domain, of a half derivative function, and as would be known to those familiar with the art, the result is a 45° phase shift and a boost of high frequencies that is necessary to properly account for the scattering of data from a line diffractor. The trace is then transformed back into the time domain by an inverse FFT at step 126.

It would be known to those familiar with the art that for small source-receiver offsets, the DMO operator should only minimally process the input trace. If the source-receiver separation for the input trace is zero, then the DMO operator should just copy the input trace to the same location and not produce any replacement traces at other, since the isochron for a coincident source-receiver geometry is a sphere and the corresponding normal to the isochron maps each point on the isochron back to the source (and receiver) position. Steps 128 and 130 are meant to deal with these small offset situations. If 2 h is less than some minimum quantity $d_{min}$, the 45° phase shift involved in the $\sqrt{-i\omega}$ operation is inappropriate. The choice of the magnitude of $d_{min}$ is empirical, but a value of 1800 ft. has been found to give good results for typical 3-D datasets. Persons skilled in the art will understand the considerations which are involved in specifying $d_{min}$.

If the source receiver separation lies between zero and $d_{min}$, a frequency weighting is applied to the input trace along with a time varying phase shift, 128 and 130. The following calculations are required:

a) A Fourier transformation, b) A multiplication by $\sqrt{\omega}$, c) Zeroing the amplitudes at the negative frequencies and doubling the amplitudes at positive frequencies except for the values at zero and the Nyquist frequency, d) Inverse Fourier transformation of the output of c), to obtain the analytic signal with the $\sqrt{\omega}$ scaling of both the real part and the imaginary part, which is its Hilbert transform (or quadrature).

Those knowledgeable in the art will recognize that steps a) and b) are simply a $\sqrt{\omega}$ filter, while steps c) and d) give the analytic signal of the filtered trace. Next, a time varying phase shift is applied to the analytic signal on a point by point basis, step 130. The instantaneous phase, as will be known to those skilled in the art, is given by the arctangent of the ratio of the quadrature (Hilbert transformed) and the real components. This instantaneous phase is shifted by $-\pi/4$ from time zero up to a cutoff time $t_c$. For times greater than $t_c$, a phase shift of $-(\pi\rho)/2$ is applied, where $$p = 0.5 \min\left(\frac{2h}{d_{min}}, 1.0\right).$$

Since $2h/_{min}$ lies between 0 and 1, p lies between 0 and 0.5, so that the phase shift varies continuously between 0 and $-\pi/4$. In actual practice, there is a linear transition zone centered at time $t_c$. Empirically, the width of this transition zone is set at 400 ms.

The value of cutoff time $t_c$ is obtained on the basis of the stationary phase analysis validity condition as defined by Winbow, G. A. and Trantham, E. C., 1994 "Nonaliased amplitude-preserving DMO", 64*th American International Meeting, Society Exploration Geophysicists, Expanded Abstracts,* 719–721. The condition can be written as $$\frac{\omega t_n}{(h/\Delta x)^2} \gg 2, \qquad (2)$$

where $t_n$ is the normal moveout time, h is half the source-receiver separation and $\Delta x$ is the input trace spacing. Empirically, it has been found that up to a cutoff time $$t_c = \frac{0.8\left(\frac{h}{\Delta x}\right)^2}{2\pi f},$$

the stationary phase condition is satisfied. A typical peak frequency f for seismic data of 25 Hertz is used in the invention to determine a time $t_c$ such that for greater times, the input data are treated as deriving from the midpoint between source and receiver, or equivalently as requiring no kinematic DMO condition.

The effect of the procedures depicted is FIG. 5 is that at offsets greater than or equal to $d_{min}$, the phase shift remains $-\pi/4$ for all times. For zero offset, the phase shift is zero at all times. For offsets, between zero and $d_{min}$, the phase shift is $-\pi/4$ for small times and gets closer to zero at large times. This particular implementation of a time varying phase shift is not to be construed as a limitation. Other methods will be obvious to those knowledgeable in the art.

DMO operator aliasing will occur when the slope (dip) of the operator becomes large enough that seismic wavelets on adjacent replacement traces undergo a relative shift of greater than one-half wavelength. The result is that high-frequency input traces will cause operator aliasing at lower dips than will low-frequency traces. One method of avoiding aliasing in the DMO process is by implementing a scheme proposed by Gray, S., *Frequency-Selective Design of the Kirchhoff Migration Operator,* 40 *Geophysical Prospecting* 565, (1992). In that scheme a number of low-pass filtered versions of each frequency-filtered and phase shifted trace are created by convolving the trace with the time domain representation of the low-pass filters. The cutoff frequencies are typically chosen to form an equispaced set, e.g. in one embodiment, the frequencies could span the range of 5 Hz to 100 Hz. Those knowledgeable in the art will know how to select the range of low pass filters to be used. This scheme is depicted at 134 in FIG. 5, and results in a suite of filtered traces at 136.

The PE is now ready to produce a set of replacement traces following the procedure in FIG. 6. As defined above, for every time on the input trace, there is a zero offset time that depends upon the position of the replacement trace. Each PE determines an aperture for the DMO operator based upon the source-receiver offset h of its input trace and the DMO velocity v. By aperture of the operator is meant the maximum distance from the common midpoint of the trace for which replacement traces are to be generated as a function of zero offset time. The source-receiver offset and the velocity determine the isochron and, as will be understood by those skilled in the art, there can be no zero-offset reflections originating from beyond the maximum horizontal extent of the isochron.

Each PE selects the output position of the replacement trace, 140 in FIG. 6. Initially, this would be the first output position for which a replacement trace is desired, as specified by the analyst. The PE selects the output time sample on this output trace, 142. Initially, this would be the first desired time sample on the output trace as specified by the analyst. In an embodiment where the DMO velocity is constant, a time sample $t_n$ on the NMO-corrected input trace that would be moved to the time $t_0$ on the replacement trace is computed, 144 in FIG. 6. The relationship between $t_0$ and $t_n$ is given by equation 1. In performing this computation, x is the distance from the midpoint of the source and receiver positions for the input trace to the location of the output trace while h is half the distance between the source and the receiver positions on the input trace.

The slope of the DMO operator at the output location, $\theta_d$, is also determined at 144 by differentiating to in equation 1 with respect to x. Next, a frequency $f_{max}$ such that $$\Delta x \tan \theta_d = \frac{v}{2f_{max}}\sqrt{1 - \frac{x^2}{h^2}} \quad (3)$$

is calculated. In equation 3, $\Delta x$ in a preferred embodiment is the spacing between the replacement traces, whichever is larger, and v is the propagation velocity. For the constant velocity case, the slope of the DMO operator tan $\theta_d$ is readily obtained from equation 1. The replacement traces would be located on the straight line joining the source and the receiver.

Following the computation of $f_{max}$, the filtered trace from the suite of filtered traces, 136, in FIG. 5, having the highest frequency that does not exceed $f_{max}$ is used to produce the replacement trace value at the output time sample for the output location of the DMO operator, step 146 of FIG. 6. As will be known to those familiar with the art, the input time $t_n$ corresponding to a given output time may not correspond to a time for which a sample exists, i.e., it may lie between two sampled values on the input trace. In such a case, the value at the output time is obtained by a linear interpolation between the values on the input trace immediately bracketing the input time $t_n$. As would be known to those skilled in the art, other methods of interpolation could be used.

A feature of the present invention is that correct amplitude weighting is applied to the interpolated value to ensure that steeply dipping reflections do not become attenuated with respect to less steeply dipping reflections. The method of determination of the amplitude scaling factor is given in Black et. al. and is not repeated here. The process of interpolation and amplitude correction of the replacement trace sample is performed at 148. At step 150, the amplitude corrected value for the output sample at the output location is stored in the memory of the PE.

Next, a check is made to see if any more output samples are required, 152. If so, processing continues for the next sample, 154, and returning to 142. If all the samples for the output trace have been generated a check is made to see if any replacement traces at other output positions are required, 158. If so, processing continues for the next output position, 160, and returning to 140.

If replacement traces for all the output positions for this input trace have been generated, the PE sends a signal to the PEs that are responsible for the output positions for which it has generated replacement traces, indicating that the replacement traces are available, 162. After all the analysis PEs have received these replacement traces, as described below, the PE then waits for the next input trace to be sent to it by the control PE, 168, and to begin to generate replacement traces for that input trace, as described above starting at step 140.

Another task of analysis PE group 108 is to read the replacement traces from the other PEs in the group. When a PE receives a signal that replacement traces have been generated by any of the other PEs, 164 in FIG. 6, the PE begins the task of generating an output trace. The replacement traces are read from the memory of the other PEs that have generated replacement traces for the output positions for which PE is responsible, step 166. If no trace currently exists for the output location, it simply accepts the replacement trace, creating a partial output trace. If, however, a partial trace already exists for the output location, then the incoming replacement trace is added to the existing partial output trace. In this fashion, the PEs are performing the summation step required to complete the Kirchhoff DMO.

The result of the first stage of the present method is that each PE performs two tasks. First, each PE computes DMO corrected replacement traces for a number of output positions; second, each PE also reads the replacement traces from the memory of other PEs and performs the Kirchhoff summation.

During this stage, the memory of the individual PEs may fill up. When this happens, any of the group of PEs, 108, that has reached the limits of its memory sends a signal to one of the group of processors, that are designated as input/output (I/O) processors, 110 in FIG. 4. The number of I/O PEs will typically be equal to the number of offsets for which a DMO image is being computed. The analysis PEs communicate with each other to determine the minimum stacking bin number in memory for each offset, and then communicate this value to the I/O PEs. The designation of the stacking bin numbers was discussed above in reference to FIG. 2. The I/O PEs first read the data in the stacking bins from disk 112 (or other data storage device selected by the analyst), beginning at the minimum stacking bin number, using requests for large blocks of data for reasons of efficiency. The I/O PEs then receive replacement traces (that may possibly be partially stacked) from the analysis PEs, use these to update the contents of the stacking bins, and write them out to disk, 112 in FIG. 4, in a common offset form, freeing up memory locations on the PEs in the processor group 108. Each of the processors in the I/O group 110 accesses a different part of the disk, so that there is no interaction within group I/O, and therefore no hyphenated interaction is depicted in group 110 of FIG. 4. The process of determining minimum stacking bin number, reading from disk, updating, and writing back to disk is repeated until the memories of the analysis PEs have been flushed of their replacement traces. This continues until all the analysis PEs have completed their analysis tasks. At the end of this stage, the contents of the stacking bins are on disk 112 in (t, x, y) order and separated into common offset data volumes.

With each PE generating replacement traces for a wide range of migration distances, independently performing filtering and interpolation, and summing replacement traces assigned output positions, the present invention has an inherent load balancing characteristic among the PEs. Balancing of memory usage and interprocessor communication is also obtained by the allocation of output locations for the PEs, discussed below in reference to FIG. 8.

Figure 7:
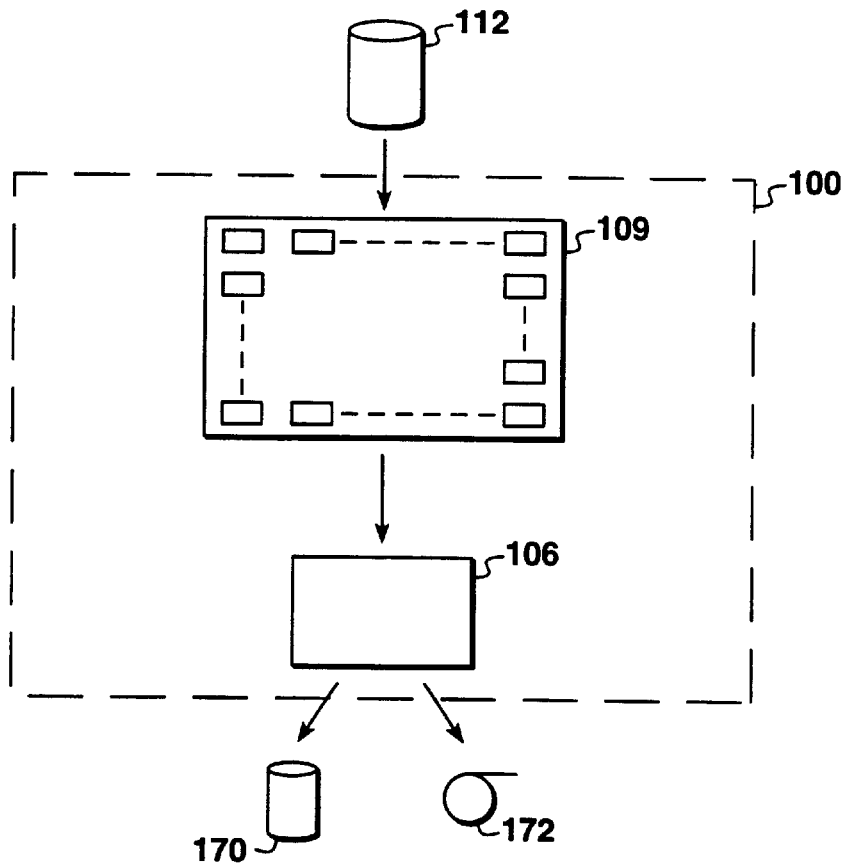
FIG. 7 depicts a simplified functional block diagram of a parallel processing system for the output phase.

The parallelization system to be employed in the output stage of the present invention is shown in FIG. 7. The MPP, 100, has an output control processor, 106, but the processor groups 108 and 110 are now replaced by a single group of PEs, 109. None of the processors in group 109 communicate with each other. This is depicted by the lack of interconnection between the individual PEs. The dashes in group 109 of FIG. 7 indicate the presence of more PEs not shown in the figure and do not indicate interconnection between the PE's shown. Furthermore, the PEs in group 109 are performing identical tasks so that there is no longer a distinction between analysis PEs and I/O PEs. The tasks performed by group 109 are those of reading data from a data storage device, such as disk, 112, and transmitting the data to the output control PE, 106. The reading from disk is done in parallel as the PEs individually access different parts of disk, 112. The output control PE 106 then reads header records from disk, 112, adds these to the seismic data received from the PEs 109 to form output traces and writes the output traces to output data storage, such as tape, 172, or other mass storage device, 170. The output write is performed sequentially in order to maintain the proper order of traces on the output medium.

Figure 8:
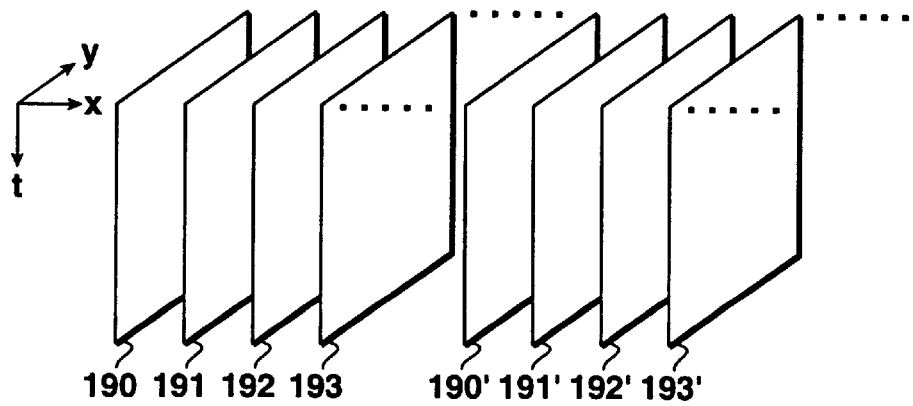
FIG. 8 illustrates the interleaved allocation of output locations to the individual processing elements.

One of the features of the present invention is to ensure load balancing by distributing the processing phase among the analysis PEs. One aspect of this load balancing characteristic is that the responsibility for x-slices from the (x, y) grid of stacking bins is distributed among the analysis PEs. A second load balancing feature is shown in FIG. 8, where for purposes of illustration only and without restriction, the position of the output slices in the output data volume are indicated with only four PEs used for the output imaging. The individual PEs, numbered 190 through 193, are repeated in a cyclic fashion so that each PE is responsible for portions of the output spaced at regular intervals throughout the entire data volume. This leads to a better balancing of memory usage and interprocessor communication than if each PE was responsible for a local portion of the model. In the absence of this interleaving, i.e., if each processor was responsible for a different local portion of the 3-D data volume, there could be a marked variation in memory usage and interprocessor communication at different stages of the processing. For example, the input data are usually in shot sequential order and in the absence of interleaving, all the PEs would be computing replacement traces for output positions assigned to a small number of PEs. The memory of these small number of PEs would fill rapidly and all interprocessor communication would be directed to these PEs. Balancing the load on the different PEs would then become more difficult.

Those knowledgeable in the art would recognize that this process will work more efficiently when the input traces, within a common offset panel, are in shot sequential order. When data are in shot sequence, due to the limited aperture of the DMO operator, a given output location is likely to have replacement traces summed into it several times before the memory of the PE responsible for that location becomes full. Memory locations are therefore reused several times, lessening the need for disk I/O and increasing process efficiency.

A second embodiment of the present invention deals with the situation where the velocity in the subsurface varies either linearly or arbitrarily with depth. This is a more realistic situation, as will be known to those familiar with the art. As disclosed by Dietrich and Cohen, the MZO operator has a crossline component, so that the possible output locations are no longer limited to the line joining the source and receiver positions. In addition, in the presence of a vertical velocity gradient, the MZO operator becomes multivalued. The first value, on the primary branch, corresponds to smaller dips while the second value, on the secondary branch of the MZO operator, corresponds to larger dips and overturned reflectors.

The result is that even in the absence of cable feathering there will be replacement traces on an (x, y) grid from a single seismic line, as opposed to the traces being limited to a single vertical plane. However, as Dietrich and Cohen show, the crossline contributions are strongly attenuated and for most practical situations, it is sufficient to restrict the operator to a swath of width 0.4 h centered on the line joining the source and receiver. The embodiment discussed below implements only the inline portion of the operator and does not compute replacement traces for a crossline displacement. This is not to be construed as a limitation because other implementations, incorporating a crossline displacement, are within the scope of the invention, as is further described below. The present invention also accounts for the multiple values of the MZO operator.

Figure 9:
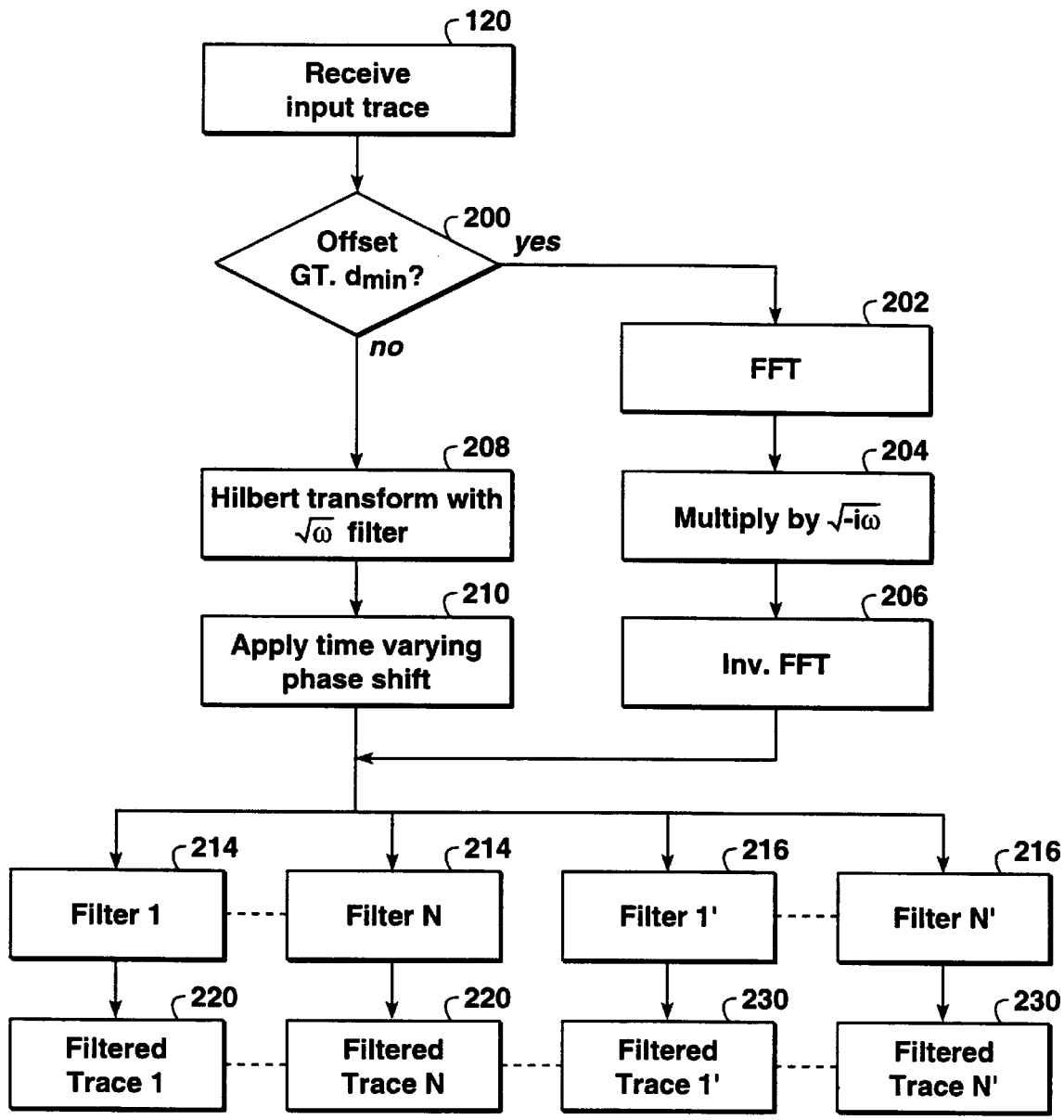
FIG. 9 shows a block diagram of the preliminary phase shifting and bandpass filtering done on each trace prior to MZO correction in a second embodiment of the present invention.
Figure 10B:
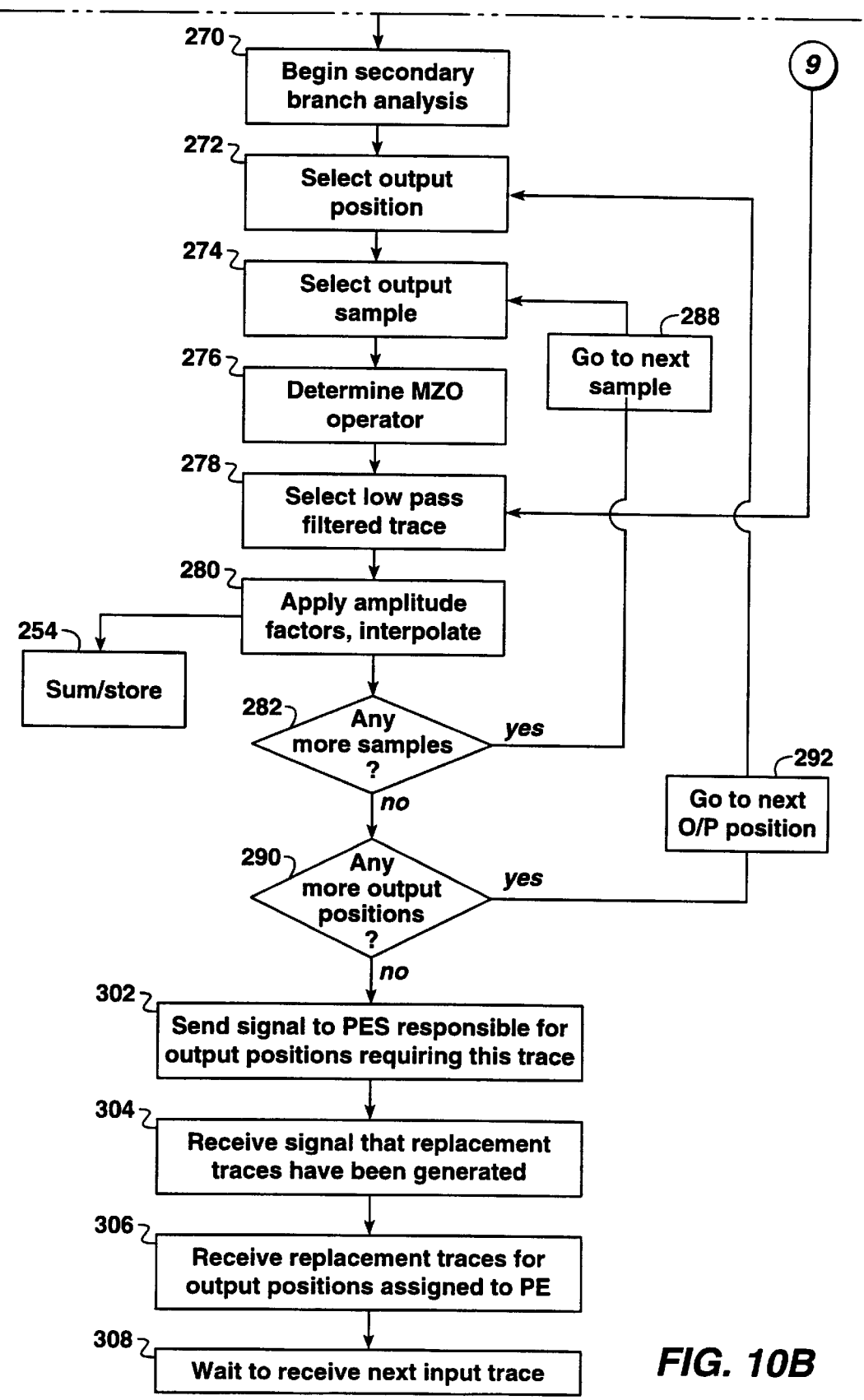

The calculations involved in the second embodiment are shown in FIGS. 9 and 10, which analogous to FIGS. 5 and 6. The process starts, as before, with the input trace, 120. Steps 200, 202, 204, 206, 208 and 210 in FIG. 9 perform the same operations as were discussed with respect to steps 121, 122, 124, 126, 128 and 130 respectively in FIG. 5. In other words, a constant phase shift is applied for large offsets and a time varying phase shift is applied for small offsets.

The result is the same as stated above. At an offset greater than or equal to $d_{min}$, the phase shift remains $-\pi/4$ for all times; for zero offset, the phase shift is zero at all times; and for offsets between zero and $d_{min}$, the phase shift is $-\pi/4$ for small times and approaches zero at large times. This particular implementation of a time varying phase shift is not to be construed as a limitation. Other methods will be obvious to those knowledgeable in the art.

Aliasing is avoided, as in the constant velocity DMO case, by computing a suite of bandpassed versions of the filtered trace. However, the MZO operator requires the filtered traces as well as their quadrature components. The "real" part of the traces is used for the primary branch of the MZO operator using a suite of low pass filters, 214, to give output traces 220. A suite of quadrature traces, 230, is computed, using a Hilbert transformed suite of lowpass filters, 216. These quadrature traces are used for the secondary branch of the MZO operator.

The generation of the MZO corrected traces is discussed with reference to FIG. 10. As in the first embodiment, the generation of the output traces is performed with reference to output locations and time samples on the output traces. However, the MZO operator does not have a simple analytic expression as does the DMO operator. To simplify the processing, the MZO operator is stored as a set of table values in each analysis PEs memory. The table is generated in two stages which occur prior to the steps shown in FIG. 10. First, for a given input location and time, the corresponding MZO operator time at a desired output location is computed based on the disclosure of Dietrich and Cohen. A correction, discussed below, is applied to the derived amplitudes. By a process of interpolation, familiar to those skilled in the art, a "backward" table —from the output time to the input time—is generated. In order to use less memory for these operators, the mapping is computed for three offsets that span the range of offsets that will be processed. The computations are performed on a time sampling interval that is typically coarser than the desired output sample rate. Typically, for data sampled at 4 milliseconds (ms), it has been found adequate to compute the operator values at a 16 ms. sampling rate. In addition to the MZO operator itself, the slope of the operator (required for anti-alias filtering) and the amplitude factors (required for proper handling of the amplitudes of the output traces) are computed and stored. The computation of the MZO operator for three offsets is not to be construed as a limitation. Obviously, if the input data has only one offset, the operator need only be computed for that offset.

FIG. 10 involves two analogous, but sequential, computations—first for the primary branch of the MZO operator, steps 240–260, and second, in sequence, for the secondary branch, steps 270–290. As in the first embodiment, all PEs perform this sequence in parallel using assigned input traces. The first output position is selected, 242, and the initial selection of the output sample number is made, 244. Due to the multivalued nature of the MZO operator, it would be familiar to those knowledgeable in the art that for each input time, there may be two output times. Conversely, for each output time, there may be two times on the input trace being handled by the processor that will make a contribution to the particular output location. One of these will correspond to the primary branch of the MZO operator and the other to the secondary branch. The MZO operator corresponding to the desired output time is determined, 246. This is performed by looking up the precomputed table values and performing an interpolation, as will be understood by those familiar with the art. The table will be different for the primary branch and the secondary branch. Next, in a manner similar to that performed in the first embodiment, a low passed filtered version of the input trace is selected, 248, based on the anti-aliasing considerations discussed above. For the primary branch of the MZO operator, the appropriate trace would be selected from the suite of filtered traces at step 220 in FIG. 9, i.e., without the Hilbert transform. For the secondary branch of the MZO operator, the trace would be selected from the suite of filtered traces at step 230 in FIG. 9, i.e. with the Hilbert transform applied. An amplitude factor is applied and interpolation is performed, 250, again using a table lookup. Those familiar with the art would recognize that the times, slopes and amplitude factors on the secondary branch would all be different from those on the primary branch. The value from the branch of the MZO operator that is computed first is stored in PE memory at 254.

The other steps in the second embodiment are similar to those for the embodiment discussed above in reference to FIG. 6. A check is made to see if any more output samples are desired, 252. If so, the processing goes on to the next output sample, 258, resuming at 244. If not, a check is made to see if any more output positions remain for which traces are to be generated, 260. If so, these are produced, 262, going back to 242. The entire sequence is repeated for the secondary branch, steps 270 through 290, with the results added to the primary branch result at 254. When both branches have been completed, the PE sends signals to the PEs responsible for the output positions for which it has created replacement traces, 302. The PE also receives a signal indicating that replacement traces have been generated by other PEs, 304, and receives the replacement traces for the output positions for which the PE is responsible, 306. The PE then waits for the next input trace to be sent to it, 308.

As would be familiar to those knowledgeable in the art, where the primary and secondary branches of the MZO operator come together, there is an abrupt termination of the operators. This arises because the analysis of Dietrich and Cohen is based on ray-theoretical principles, which do not predict the nonspecular part of the operator that would, in a wave theory sense, extend past the edge of the specular termination point. This point may be referred to as the cusp. A problem which may arise is that the amplitude at the cusp is large, thereby introducing discontinuities in the resultant image that should not exist. Wave-theoretical considerations dictate that there cannot be an abrupt termination of the operator at the cusp. The present invention deals with the problem by artificially extending the operator to approximate the nonspecular component. Those familiar with the art would be aware that such an extension is predicted on wave-theoretical principles. An extension by a distance of 0.05 h to 0.10 h beyond the cusp has been empirically found to give satisfactory results. In a preferred embodiment, a value of 0.10 h will be selected. The extension is done using a second order Taylor series expansion of the primary branch of the operator (step 248 of FIG. 10). Over this extension, the amplitudes are tapered by a $Cos^2$ weighting to bring them naturally to zero.

As noted above, the amplitudes derived by Dietrich and Cohen are inconsistent with other prior art results. We have found that, on model-generated synthetic seismograms, the MZO amplitudes given by Dietrich and Cohen give erroneous results. Based on considerations of the width of the Fresnel zone over which there is constructive reinforcement of the MZO operator, the second embodiment of the present invention multiplies the amplitude factors of Dietrich and Cohen by $\sqrt{t_0/h}$. This compensates for the MZO operator getting narrower with increasing time as well as the fact that the operator gets broader with increasing source-receiver separation. This multiplier corresponds to the x=0 scale factor of Black's et. al., and although that scale factor is not rigorously correct for MZO analysis, use of the multiplier has been found empirically to improve the Dietrich and Cohen results.

The extension to the case where crossline components of the MZO operator are also included is within the scope of the present invention. That extension requires that there would be many more positions to be considered at step 242 in FIG. 10—the selection of the output location. Even if the generation of the crossline components is restricted to a swath of width 0.4 h centered on the line between the source and receiver, in typical marine seismic applications (with over 240 channels of recording), the number of locations could increase by up to two orders of magnitude.

The I/O processors, 110 in FIG. 4, play the same role in the second embodiment as in the first embodiment. Similarly, in the second embodiment, the generation of the output traces is identical to the process used in the first embodiment, FIGS. 7 and 8.

Those knowledgeable in the art will also recognize that as the number of PEs increases, there will be a decrease in the amount of data processed by each PE. It has been our experience that best overall efficiency is obtained if the incoming data volume is subdivided and multiple jobs are run, each using 16 or 32 PEs, rather than a single job for the entire data volume with 64–128 PEs. The communication requirements in the latter case outweigh the other efficiencies that parallelism produces.

It would be understood by that there are numerous methods for performing zero-offset calculations and that the scope of this invention includes and is applicable to these various methods.

What we claim is:

1. A two stage parallelization method for processing seismic data comprising input traces on a computer system having multiple processing elements, comprising the steps of:
    a) processing said input traces to create output traces using an input parallelization stage wherein
        i) at least one of said processing elements is assigned input control tasks, said input control tasks comprising downloading said input traces from an input data storage device, transmitting said input traces to said analysis processing elements, and assigning output positions to each said analysis processing element,
        ii) a plurality of said processing elements are each assigned a plurality of analysis tasks wherein processed seismic data is produced, said analysis tasks comprising creating from each of said input traces a replacement trace at each of a plurality of output positions, and transmitting each of said replacement traces to the analysis processing element to which said output position for each of said replacement traces has been assigned, and
        iii) at least one of said processing elements is assigned input/output tasks; and
    b) converting said output traces to output format using an output parallelization stage wherein
        i) at least one of said processing elements is assigned output control tasks, and
        ii) at least a plurality of said processing elements are assigned read/transmit tasks.

2. The method of claim 1, wherein said assigned output positions correspond to interleaved slices in a three dimensional data volume.

3. The method of claim 1, further comprising the analysis task of preprocessing said seismic data.

4. The method of claim 1, further comprising the analysis task of processing said seismic data into zero-offset equivalent format.

5. The method of claim 4, wherein each said analysis processing elements generates said zero-offset equivalent format data by
    a) receiving said seismic data from said control processing element,
    b) determining a zero-offset equivalent format partial contribution, and
    c) producing said zero-offset equivalent format data by summation of said partial contribution with said partial contributions received from at least one other said analysis processing element.

6. The method of claim 1, further comprising the input/output tasks of receiving processed seismic data from said analysis processing elements and writing said processed seismic data to a data storage device.

7. The method of claim 6, wherein each said input/output processing element generates zero-offset equivalent format data by
    a) reading said processed seismic data from said data storage device,
    b) combining said read data with a zero-offset equivalent format partial contribution received from at least one analysis processing element, and
    c) writing said combined data to said data storage device.

8. The method of claim 1, further comprising the read/transmit tasks of reading said processed seismic data from a data storage device and transmitting said processed seismic data to said output control processing element.

9. The method of claim 1, further comprising the output control tasks of
    a) reading output data header records,
    b) combining said output data header records with said processed seismic data to generate output format data, and
    c) writing said output format data to output data storage.

10. The method of claim 1, further comprising the input/output task of generating zero-offset equivalent format data by
    receiving processed seismic data from said analysis processing elements and writing said processed seismic data to a data storage device,
    reading said processed seismic data from said data storage device,
    combining said read data with a zero-offset equivalent format partial contribution received from at least one analysis processing element, and
    writing said combined data to said data storage device.

* * * * *